(12) United States Patent
Alexander et al.

(10) Patent No.: US 8,409,479 B2
(45) Date of Patent: Apr. 2, 2013

(54) CERAMIFYING COMPOSITION FOR FIRE PROTECTION

(75) Inventors: Graeme Alexander, Hampton East (AU); Yi-Bing Cheng, East Burwood (AU); Robert Paul Burford, Summer Hill (AU); Robert Shanks, Glen Iris (AU); Jaleh Mansouri, Rosebery (AU); Kenneth Willis Barber, Little River (AU); Pulahinge Don Dayananda Rodrigo, Doncaster (AU); Christopher Preston, Glen Iris (AU)

(73) Assignee: Olex Australia Pty Ltd (AU)

( * ) Notice: Subject to any disclaimer, the term of this patent is extended or adjusted under 35 U.S.C. 154(b) by 829 days.

(21) Appl. No.: 10/594,649

(22) PCT Filed: Mar. 31, 2005

(86) PCT No.: PCT/AU2005/000465
§ 371 (c)(1),
(2), (4) Date: Sep. 27, 2006

(87) PCT Pub. No.: WO2005/095545
PCT Pub. Date: Oct. 13, 2005

(65) Prior Publication Data
US 2007/0246240 A1 Oct. 25, 2007

(30) Foreign Application Priority Data
Mar. 31, 2004 (AU) ............................... 2004901751

(51) Int. Cl.
*C09K 21/04* (2006.01)

(52) U.S. Cl. ............ 252/609; 252/601; 174/110 R; 106/18.11; 106/18.14

(58) Field of Classification Search ............ 252/600, 252/601, 609; 174/110 R; 106/18.11, 18.14; 524/414
See application file for complete search history.

(56) References Cited

U.S. PATENT DOCUMENTS

| | | | |
|---|---|---|---|
| 3,576,940 A | 5/1971 | Stone et al. | |
| 3,912,650 A | 10/1975 | Khalid et al. | |
| 4,172,735 A | 10/1979 | Wegerhoff et al. | |
| 4,189,619 A | 2/1980 | Pedlow | |
| 4,225,649 A | 9/1980 | Peterson | |
| 4,269,753 A | 5/1981 | Mine et al. | |
| 4,269,757 A | 5/1981 | Mine et al. | |
| 4,514,466 A | 4/1985 | Leon et al. | |
| 4,529,467 A | 7/1985 | Ward et al. | |
| 4,549,041 A | 10/1985 | Shingo et al. | |
| 4,686,135 A | 8/1987 | Obayashi et al. | |
| 4,725,457 A | 2/1988 | Ward et al. | |
| 4,800,124 A | 1/1989 | Davis et al. | |
| 4,806,416 A | 2/1989 | Puzo | |
| 4,816,510 A | 3/1989 | Yates, III | |
| 4,879,066 A | 11/1989 | Crompton | |
| 4,992,481 A | 2/1991 | Von Bonin et al. | |
| 5,034,056 A | 7/1991 | Von Bonin | |
| 5,061,736 A | 10/1991 | Takahashi et al. | |
| 5,108,832 A | 4/1992 | Nugent, Jr. et al. | |
| 5,126,076 A * | 6/1992 | Graf et al. ............ | 252/604 |
| 5,173,960 A | 12/1992 | Dickinson | |
| 5,227,586 A | 7/1993 | Beauchamp | |
| 5,246,974 A | 9/1993 | Jonas et al. | |
| 5,262,454 A | 11/1993 | Leroux et al. | |
| 5,284,700 A | 2/1994 | Strauss et al. | |
| 5,418,272 A | 5/1995 | Kawabata et al. | |
| 5,424,352 A | 6/1995 | Watanabe | |
| 5,449,710 A | 9/1995 | Umeda et al. | |
| 5,851,663 A | 12/1998 | Parsons et al. | |
| 6,174,943 B1 | 1/2001 | Matsumoto et al. | |
| 6,239,378 B1 | 5/2001 | Shephard | |
| 6,425,947 B1 | 7/2002 | Berlin et al. | |
| 6,433,049 B1 | 8/2002 | Romenesko et al. | |
| 6,454,969 B1 | 9/2002 | Nishihara | |
| 6,555,605 B1 * | 4/2003 | Casiraghi ............ | 524/126 |
| 6,576,691 B2 | 6/2003 | Nakashima et al. | |
| 6,935,137 B2 | 8/2005 | Kerenyi et al. | |
| 6,979,662 B1 | 12/2005 | Coster et al. | |
| 7,304,245 B2 | 12/2007 | Alexander et al. | |
| 7,378,463 B2 * | 5/2008 | Abu-Isa ............ | 524/100 |
| 2003/0031818 A1 | 2/2003 | Horacek | |
| 2003/0059613 A1 | 3/2003 | Tirelli et al. | |
| 2003/0199623 A1 | 10/2003 | Demay et al. | |
| 2004/0216914 A1 * | 11/2004 | Vexler et al. ............ | 174/121 A |
| 2005/0205290 A1 | 9/2005 | Pinacci et al. | |

FOREIGN PATENT DOCUMENTS

| | | |
|---|---|---|
| CA | 2 337 317 A1 | 2/2001 |
| CN | 2037862 U | 5/1989 |
| DE | 3233504 A1 | 3/1984 |
| DE | 4132390 A1 | 4/1993 |
| EP | 0248404 A2 | 12/1987 |
| EP | 559382 A1 | 2/1993 |

(Continued)

OTHER PUBLICATIONS

Supplemental European Search Report for European Patent Application No. EP05714334 (Aug. 12, 2008).

*Primary Examiner* — Mark Kopec
*Assistant Examiner* — Haidung Nguyen
(74) *Attorney, Agent, or Firm* — Nixon Peabody LLP

(57) ABSTRACT

The invention relates to a ceramifying composition for forming a fire resistant ceramic under fire conditions the composition comprising: (i) at least 10% by weight of mineral silicate; (ii) from 8% to 40% by weight of at least one inorganic phosphate that forms a liquid phase at a temperature of no more than 800° C.; and (iii) at least 15% by weight based on the total weight of the composition of a polymer base composition comprising at least 50% by weight of an organic polymer.

36 Claims, 2 Drawing Sheets

FOREIGN PATENT DOCUMENTS

| | | | |
|---|---|---|---|
| EP | 1026700 A2 | 8/2000 |
| EP | 1043368 A2 | 10/2000 |
| EP | 1217058 A1 | 6/2002 |
| EP | 1283237 B1 | 2/2003 |
| FR | 2 822 836 A1 | 3/2001 |
| GB | 2268497 A | 1/1994 |
| JP | 53016758 A | 2/1978 |
| JP | 78044397 | 11/1978 |
| JP | 54131792 A | 10/1979 |
| JP | 55078073 A | 6/1980 |
| JP | 59127749 | 7/1984 |
| JP | 63020348 A | 1/1988 |
| JP | 63126740 A | 5/1988 |
| JP | 1223141 A | 11/1989 |
| JP | 5254912 A | 10/1993 |
| JP | 9012888 A | 1/1997 |
| JP | 9055125 A | 2/1997 |
| JP | 10094707 A | 4/1998 |
| JP | 2001035267 | 2/2001 |
| JP | 2002105317 A | 4/2002 |
| JP | 2003100149 A | 4/2003 |
| WO | 9843251 A1 | 10/1998 |
| WO | 0066657 A1 | 11/2000 |
| WO | 0068337 A1 | 11/2000 |
| WO | 2004013255 A1 | 2/2004 |
| WO | 2004035711 A1 | 4/2004 |
| WO | WO/2004/088676 | 10/2004 |

\* cited by examiner

CERAMIFYING COMPOSITION FOR FIRE PROTECTION

This application is a national stage application under 35 U.S.C. §371 from PCT Application No. PCT/AU2005/000465, filed Mar. 31, 2005, which claims the priority benefit of Australian Application No. 2004901751, filed Mar. 31, 2004.

FIELD

The present invention relates to fire barrier compositions which function by forming a ceramic at the elevated temperatures encountered in fire conditions. The invention also relates to the preparation of such compositions and their use, for example in shaping them to form articles that require fire barrier properties. The invention will be described with reference to cable applications, which are a particularly preferred embodiment of the invention, however it will be understood that the composition may also be used in providing fire barrier properties to a range of articles.

BACKGROUND

The fire barrier properties of building materials and the maintenance of power and communication in fire situations are critical to the safety of inhabitants and effective fire fighting. As a result many countries set standards for the performance of buildings under fire conditions. For example cables for critical applications are required to continue to operate under fire conditions to ensure the maintenance of power and communications. To meet some of the Standards cables must maintain circuit integrity when heated to a specified temperature (e.g. 650, 750, 950 or 1000° C.) for a specified period of time. It is also necessary to take into account that in order to be effective, fire insulation may need to provide protection from the effects of water jet sprays and turbulent gas flows encountered under fire conditions.

It is also desirable that a material used to impart fire resistance has acceptable mechanical strength for the intended application, following exposure to the elevated temperatures likely to be encountered in a fire situation, so that it can remain in place when subjected to the mechanical shocks and/or forces (eg from strong gas currents) associated with fire scenarios.

One method of improving the high temperature performance of an insulated cable has been to wrap the conductor of the cable with tape made with glass fibres and coated with mica. Such tapes are wrapped around the conductor during production and then at least one insulating layer is applied. Upon being exposed to increasing temperatures, the outer layer(s) are degraded and fall away, but the glass fibres hold the mica in place. These tapes have been found to be effective for maintaining circuit integrity in fires, but are quite expensive. Further, the process of wrapping the tape around the conductor is relatively slow compared with other cable production steps. Wrapping tape around the conductor slows overall production of the cable, again adding to the cost. A fire resistant coating that can be applied during the production of the cable (for example by extrusion) thereby avoiding the use of tapes, is desirable.

A variety of materials have been used to impart fire resistance to structures and components, including electric cables. The use of compositions based on silicone elastomers has been reported. However, silicone elastomers can be expensive, have relatively poor mechanical properties and can be difficult to process, for example by extrusion techniques. Furthermore, these compositions tend to have the associated disadvantage that they are converted to powdery substances when exposed to fire as a result of the organic components of the silicone elastomers being pyrolised or combusted. The pyrolysis or combustion products are volatilised and leave an inorganic residue or ash (silicon dioxide) that has little inherent strength. This residue is generally not coherent or self-supporting and indeed is often easily broken, dislodged or collapsed. This behaviour mitigates against using silicone elastomers in passive fire protection. This means, for instance, that silicone polymers used as insulation on electric cables must be protected and held in place with physical supports such as inorganic tapes and braids or metal jackets.

We have found that some materials, based on silicone polymers or other polymers in combination with various inorganic additives, retain their integrity and form self-supporting ceramics on exposure to fire, and some of these have been proposed for use as insulation layers on electric cables that do not contain physical supports.

International Application PCT/AU03/00968 describes a fire resistant composition, which comprises a silicone polymer along with mica, and a glass additive in respective amounts from 5% to 30% and 0.3 to 8% by weight based on the total weight of the composition.

International Application PCT/AU03/01383 (the contents of which are herein incorporated by reference) describes a composition which contains an organic polymer, a silicate mineral filler and a fluxing agent (or precursor resulting in a fluxing agent) to result in from 1 to 15% of fluxing agent by weight of the residue resulting from fire conditions.

Other fire barrier compositions attempt to meet fire rating requirements by using inorganic materials which foam under the influence of a chemical intumescing agent during a fire. For example Horacek (US Pub 2003/0031818 and 2003/0035912) describes an intumescent strip and sheath for wires and cables which forms fire resistant glass foam under fire conditions. The intumescent component is a mixture such as dipentaerythritol, melamine and ammonium polyphosphate in specific proportions which constitutes from 20 to 35% by weight of the total composition. Keogh (US Pub 2002/0098357) describes an intumescent wrap for cables and the like in which the intumescence is provided by a 50:50 blend of ammonium phosphate and melamine. Thewes (US Pub No 2004/0051087) and Rodenberg et al (DE 103 02 198) disclose a fire protection material which likewise rely on the presence of a melamine as a blowing agent to provide foam in fire conditions. The intumescing agents such as melamine and pentaerythritol react with the polyphosphoric acid to form transient phosphate ester species which dehydrate to provide an organic foam.

Commercially available flame retardants may contain a mixture of a phosphoric acid generating agent, a charring agent such as pentaerythritol or carbohydrates and agents such as melamine which accelerate foaming. When mixed in specific proportions the composition provides intumescence. While the formation of foam provides improved insulation and a heat barrier we have found that the expansion generally results in a very mechanically weakened residue which is not self-supporting. As a result of the residue not being self-supporting the insulation is prone to fall or fracture thereby exposing the insulated material. Also the composition is more susceptible to compromising insulation in the presence of water and/or severe air currents which are frequently encountered during fires.

SUMMARY

We have now found that integrity of a ceramic forming composition may be retained by using a composition comprising certain combinations of inorganic phosphate and silicate mineral filler.

We provide in accordance with a first aspect of the invention a ceramifying composition for forming a fire resistant ceramic under fire conditions the composition comprising:
(i) at least 10% (preferably at least 15%) by weight of mineral silicate;
(ii) from 8% to 40% by weight of at least one inorganic phosphate that forms a liquid phase at a temperature of no more than 800° C.; and
(iii) at least 15% by weight based on the total weight of the composition of a polymer base composition comprising at least 50% by weight of an organic polymer.

The composition of the invention is preferably formulated to provide a self-supporting ceramic on exposure to an elevated temperature experienced under fire conditions.

When used herein the phrase "exposure to an elevated temperature experienced under fire conditions" is used to refer to severe fire conditions as simulated by heating at a temperature of 1000° C. for a period of 30 minutes.

By using the inorganic phosphate, silicate mineral filler and preferably other inorganic fillers we have found that it is possible to retain the shape and dimensions of the material as a result of trapping combustion gases during transformation of the composition to a ceramic on exposure to an elevated temperature experienced under fire conditions. Typically rectangular test specimens of the composition of the invention will undergo changes in linear dimension along the length of the specimen of less than 20%, preferably less than 10%, more preferably less than 5%, still more preferably less than 3% and most preferably less than 1%. In some cases net shape retention is the most preferred property. The retention of shape does not require the blowing agents used in intumescent compositions of the prior art. Indeed the compositions of the invention are preferably essentially free of additional intumescing agents such as melamine and pentaerythritol which we have found make it difficult to control the expansion of foams under the variety of conditions encountered in fires. We have found that controlled expansion can be achieved by using ammonium polyphosphate which, together with the other gases generated during combustion, enables the shape and dimensions of the product to be maintained under fire conditions.

The ceramic formed from the composition of the invention on exposure to an elevated temperature experienced under fire conditions preferably has a flexural strength of at least 0.3 MPa, more preferably at least 1 MPa and most preferably at least 2 MPa.

The composition may and preferably will comprise up to 30% (preferably up to 20%) by weight of at least one of hydroxides, oxides and carbonates selected from at least one of aluminium, barium, calcium and magnesium. More preferably the composition comprises 10 to 20% by weight of a component consisting of at least one compound selected from the group consisting of aluminium hydroxide (alumina trihydrate), magnesium carbonate and calcium carbonate.

In a further aspect the invention provides a cable comprising at least one elongated functional element such as a conductor and at least one coating layer comprising the hereinbefore described ceramifying composition. Preferably the cable comprises a single insulation coating and the single insulation coating is formed of the hereinbefore described ceramifiable composition. The inner surface of the ceramifiable layer may abut the functional element (such as one or more copper wires) and preferably the outer surface of the layer is free of further coatings or layers. The ceramifiable layer is preferably applied to the at least one functional element by extrusion. One of the significant advantages of the composition of the invention is that it provides a combination of fire protection and sufficient strength, on exposure to an elevated temperature experienced under fire conditions, to allow cables to be prepared using a single insulating layer of the composition of the invention. This has not generally been possible for compositions of the prior art as insulating compositions have generally been of insufficient strength to be self-supporting, to support the weight of the conductor and to withstand the conditions of water spray and gas turbulence encountered under fire conditions. As a consequence, the commercially available cables with high fire rating generally require a physical supporting and sealing layer to maintain the integrity of the insulating layer. Although such layers may be used with the composition of the invention, they are generally not required to provide a high fire rating.

The inorganic residue formed from the composition of the invention has also been found to have high electrical resistance on exposure to an elevated temperature experienced under fire conditions. This is particularly important to maintaining electrical integrity of a functional element.

The composition generally forms a self-supporting and porous ceramic when exposed to an elevated temperature experienced under fire conditions and typically at least 40% of its total composition will be inorganic compounds.

DETAILED DESCRIPTION

The ceramifying composition of the invention provides fire barrier properties on exposure to an elevated temperature experienced under fire conditions. The ceramifying composition includes mineral silicate (optionally together with other inorganic fillers) and inorganic phosphate which together with the mineral silicate forms a coherent ceramic on exposure to an elevated temperature experienced under fire conditions. On exposure to an elevated temperature experienced under fire conditions the phosphate component initially forms a liquid phase, preferably at a temperature lower than the decomposition temperature of at least one of the other gas generating components. A dispersed gas phase is formed as a result of the decomposition of the organic polymer and other components such as ammonium polyphosphate. As the temperature of the composition increases to above about 800° C. the composition forms a ceramic comprising the inorganic phosphate component and mineral silicate. The inorganic phosphate and silicate components (particularly magnesium silicate if present in the silicate component) react at the high temperatures to solidify and strengthen the walls around the pores formed by the entrapment of gaseous phase.

The shrinkage associated with the decomposition of the organic materials, and optionally also some of the inorganic components, is compensated by the formation of uniformly dispersed fine pores in the transient liquid phase.

The dispersed fine pores entrapped in the transient liquid phase formed by the decomposition of the inorganic phosphate component, enable the composition to approximately retain the original size and shape on conversion to a ceramic. The evolved gases provide a controlled expansion of the viscous liquid phase (formed on decomposition of the inorganic phosphate) which is reinforced by the combustion residue and inorganic filler particles at all stages of conversion into a ceramic under fire conditions. The controlled expansion matches the volume lost through combustion, to form a relatively strong ceramic of at least 0.3 MPa, preferably at least 1 MPa and more preferably at least 2 MPa in strength and of similar size and shape to the original article.

The controlled dispersion of fine pores, formed by the decomposition of the inorganic phosphate component (in the absence of other intumescing agents) and the interaction of the inorganic phosphate and mineral silicate filler enable the composition to form a ceramic which is self-supporting even when heated at a temperature of 1000° C. for 30 minutes.

Compositions containing significant amounts of additional intumescing agents such as melamine and/or pentaerythritol generally do not form a self-supporting ceramic under fire conditions as we have found that significant intumescence interferes with strengthening interaction of the components of the present invention.

The composition provides a ceramic on exposure to an elevated temperature experienced under fire conditions which is preferably self-supporting. A range of different conditions can be encountered in a fire. Experimentally we have examined two extreme conditions involving exposure at 1000° C. for 30 minutes. These simulated conditions, which are examples of tests examining an exposure to a temperature experienced under fire conditions are described as fast firing conditions and slow firing conditions in the examples.

In order to examine whether or not a composition is self-supporting we use the following test as our standard. The test involves specimens of nominal dimensions 30 mm×13 mm×2 mm (approximately) made from the composition which are placed on a rectangular piece of refractory so that their long axis is perpendicular to one edge of the supporting refractory block and a 13 mm long portion of each specimen is projecting from the edge of the supporting refractory block. The specimens are then heated at 12° C. per minute to 1000° C. and maintained at this temperature for 30 minutes in air. At all temperatures, the specimens of composition remain rigid and coherent without bending over the edge of the supporting block to a significant degree (i.e providing a bending angle to the original position of less than 15 degrees). The resulting ceramic will preferably retain the shape the specimen had prior to exposure to elevated temperatures.

The composition of the invention comprises at least one inorganic phosphate compound that forms a liquid phase at a temperature at no more than 800° C. (preferably no more than 500° C.). The amount of inorganic phosphate is in the range of from 8% to 40% by weight based on the total weight of the ceramifying composition although the appropriate amount to provide self-supporting properties, shape retention and strength will depend on the nature and proportion of other components including the optional fillers. Where there is more than one phosphate then the total amount of phosphates that form a liquid phase at a temperature of less than 800° C. (preferably less than 500° C.) is in the specified range (e.g. 8% to 40%). Specific examples of inorganic phosphates of this type include ammonium phosphate, ammonium polyphosphate and ammonium pyrophosphate. These inorganic phosphates decompose and form a liquid phase (containing phosphorous pentoxide) at temperatures in the range of approximately 200 to 800° C.

Phosphates such as boron phosphate (MPt>1200° C.) which have a relatively high melting point and hence do not form a liquid phase at a temperature of no more than 800° C. (preferably no more than 500° C.) do not form part of the inorganic phosphate component required by the invention and, while they may be present as additional fillers, they generally do not contribute to the transient liquid phase which is reactive with the mineral silicate. Ammonium polyphosphate offers significant advantages in the compositions of the invention and is the most preferred inorganic phosphate. Accordingly in a particularly preferred embodiment the composition of the invention comprises from 8% to 40% by weight ammonium polyphosphate based on the total weight of the ceramifying composition.

Significant advantages are provided by inorganic phosphates that form a liquid phase at relatively low temperatures under fire conditions. We have found that the liquid phase formed from the inorganic phosphate component in the composition of this invention is only a transient liquid phase. Its interaction with other components of the composition results in formation of crystalline phases and transformation of the composition into a solid ceramic at high temperature. Inorganic phosphates and in particular systems based on ammonium polyphosphate have the significant advantage of maintaining the integrity of the composition in combination with the other components of the composition of the invention. In a particularly preferred embodiment of the invention the inorganic phosphate liquid forming component is chosen to provide, in combination with other components, properties (particularly relatively high viscosity) which will entrap an adequate amount of gas pores and maintain the shape and dimensions of the product. If the viscosity of the transient liquid phase formed under these conditions is relatively low, all the gas produced may be lost, resulting in an increased likelihood of failure through shrinkage and possibly also loss of the liquid component.

It is believed that on exposure to an elevated temperature experienced under fire conditions the inorganic phosphate in the composition of the invention decomposes at a temperature at or below the decomposition temperature of at least a portion of the other components. In the case of ammonium polyphosphate the decomposition products include ammonia and phosphoric acid. The ammonia may contribute to the porosity of the ceramic formed on solidification of the transient liquid phase. The phosphoric acid reacts with any organic material in its proximity initially forming a carbonaceous char which is oxidatively depleted as the composition is further heated and forms a ceramic.

The viscosity of the transient liquid phase which is optimal to entrap gas will of course depend on the types and volumes of gases generated and the proportions of organic components and any optional components such as processing aids and the like.

The inorganic phosphate is most preferably ammonium polyphosphate and is present in an amount of from 8 to 40% by weight of the total composition.

In one embodiment of the invention the inorganic phosphate is preferably present in an amount of from 15 to 40% and still more preferably from 20 to 40% by weight of the total composition. Such compositions may be preferred where high strength of the resulting ceramic is a priority.

In another, more preferred embodiment the inorganic phosphate is present in an amount in the range of from 8 to 20% by weight of the total composition, more preferably from 10 to 20% and still more preferably from 10 to 15% by weight of the total composition. Compositions of this embodiment are particularly suited to applications where good electrical insulation is required under fire conditions (at elevated temperatures). This embodiment is, for example, particularly preferred in cables used to maintain essential services under fire conditions and indeed may even allow a single insulating layer to be used.

Generally the inorganic phosphate component will form a liquid at temperatures below 450° C. Gases are produced by thermal decomposition of components in the composition including the organic components. Examples of inorganic gas producing materials include hydrated materials such as magnesium hydroxide and aluminium hydroxide, carbonates such as magnesium carbonate and calcium carbonate and ammonium polyphosphate. Examples of organic gas producing materials include organic polymers and any organic processing additives. It is particularly preferred that the gas generating component is finely divided and distributed throughout the ceramic forming component.

The gas-generating component may comprise a mixture of compounds that generate gas at elevated temperatures. Preferably the gas-generating component will generate at least a portion of gas above the temperature at which the inorganic liquid forming component forms a liquid. The gas phase is trapped by the liquid phase which is transiently formed under fire conditions during transformation of the composition to a ceramic. The gas phase appears in the ceramic as fine pores. Further we have found that the silicate component interacts with the liquid phase to provide part of the structure of the walls defining the pores in the resulting ceramic.

The composition of the invention will typically form a self-supporting ceramic at temperatures encountered under fire conditions. The porosity of the resulting ceramic is preferably in the range of from 20 vol % to 80 vol %. Preferably at least 40% of its total composition will be inorganic fillers.

The compositions in accordance with the present invention also include silicate mineral filler. Such fillers typically include alumino-silicates (e.g. kaolinite, montmorillonite, pyrophillite—commonly known as clays), alkali alumino-silicates (e.g. mica, feldspar, spodumene, petalite), magnesium silicates (e.g. talc) and calcium silicates (e.g. wollastonite). Mixtures of two or more different silicate mineral fillers may be used. Such fillers are commercially available. Silicon dioxide (silica) is not a silicate mineral filler in the context of the present invention.

The composition typically comprises at least 10% by weight, preferably at least 15% and most preferably at least 25% by weight of silicate mineral filler. The maximum amount of this component tends to be dictated by the nature of the product and the level of the silicate which will not unduly impair processing of the composition.

Inorganic fibres which do not melt at 1000° C. can be incorporated, including aluminium oxide fibres, may be incorporated in composition of the invention.

In addition to mineral silicate fillers, a wide range of other inorganic fillers may be added. The composition may and preferably will comprise an additional inorganic filler comprising an amount of up to 30% (preferably up to 20%) by weight of the total composition of at least one of metal hydroxides, metal oxides and metal carbonates. Examples of metal ions in such inorganic fillers include calcium, aluminium, magnesium, barium, caesium, cobalt, iron, lead, manganese, nickel, rubidium, strontium and zinc. The preferred additional inorganic fillers are selected from at least one of hydroxides, oxides and carbonates of at least one of aluminium, barium, calcium and magnesium. The oxides, hydroxides and carbonates of aluminium, calcium and magnesium are more preferred and still more preferred are alumina trihydrate, magnesium carbonate and calcium carbonate. Preferably the amount of the additional inorganic filler is in the range of from 5% to 20% by weight of the total composition.

The composition of the invention is preferably essentially free of intumescing agents such as melamine, melamine phosphate, melamine pyrophosphate, pentaerythritol and the like.

The composition of the invention forms a ceramic on exposure to temperatures experienced under fire conditions. We have found that the composition passes through a transitional phase on heating. The ceramic comprises a phase formed from the inorganic phosphate and dispersed mineral silicate and, optionally, other filler particles and a gas phase formed from decomposition products, which maintain the shape and dimensions of the material.

The self-supporting properties, dimensional stability and strength of the composition may be compromised in the presence of significant amounts of such intumescing agents. The optimum proportion of components within the ranges described above (in particular the inorganic phosphate and mineral silicate) may be determined by a person skilled in the art having regard to the herein described contribution of those components to the performance characteristics of the composition. Typically the composition will contain less than 1% by weight of the composition of melamine and pentaerythritol although the tolerable amounts may be determined having regard to the hereinbefore described tests for examining self-supporting properties under fire conditions and the strength and change in dimensions under fire conditions.

In one embodiment of the invention the ceramic forming composition consists essentially of:
i). at least 15% by weight based on the total weight of the composition of a polymer base composition comprising at least 50% by weight of an organic polymer;
ii). 8-40% by weight of at least one inorganic phosphate that forms a liquid phase at a temperature of no more than 800° C. (preferably no more than 500° C.) based on the total weight of the composition,
iii). at least 10% by weight based on the total weight of the composition of silicate mineral filler;
iv). optionally an additional inorganic filler in an amount of up to 30%; and wherein the composition forms a self-supporting ceramic on exposure to an elevated temperature experienced under fire conditions.

The composition of the invention comprises an organic polymer. An organic polymer is one that has an organic polymer as the main chain of the polymer. Silicone polymers are not considered to be organic polymers, however, they may be usefully blended with the organic polymer(s), as the minor component, and beneficially provide a source of silicon dioxide (which assists in formation of the ceramic) with a fine particle size when they are thermally decomposed. The organic polymer can be of any type, for example a thermoplastic polymer, a thermoplastic elastomer, a cross-linked elastomer or rubber, a thermoset polymer. The organic polymer may be present in the form of a precursor composition including reagents, prepolymers and/or oligomers which can be reacted together to form at least one organic polymer of the types mentioned above.

Preferably, the organic polymer can accommodate high levels of the inorganic components required to form the ceramic, whilst retaining good processing and mechanical properties. It is desirable in accordance with the present invention to include in the fire resistant compositions high levels of the inorganic components as such compositions tend to suffer reduced weight loss on exposure to fire when compared with compositions having lower levels of the inorganic components. Compositions loaded with relatively high concentrations of inorganic components are therefore less likely to shrink and crack when ceramified by the action of heat.

It is also advantageous for the chosen organic polymer not to flow or melt prior to its decomposition when exposed to the elevated temperatures encountered in a fire situation. The most preferred polymers include ones that are cross-linked after the fire resistant composition has been formed, or ones that are thermoplastic but have high melting points and/or decompose to form a char near their melting points; however, polymers that do not have these properties may also be used. Suitable organic polymers are commercially available or may be made by the application or adaptation of known techniques. Examples of suitable organic polymers that may be used are given below but it will be appreciated that the selection of a particular organic polymer will also be impacted by such things as the additional components to be included in the fire resistant composition, the way in which the composition is to be prepared and applied, and the intended use of the composition.

Organic polymers suitable for use with this invention include thermoplastic polymers, thermoset polymers, and (thermoplastic) elastomers. Such polymers may comprise at least one polymer selected from the group consisting of homopolymers and copolymers of polyolefins, vinyl polymers including poly vinyl chloride, acrylic and methacrylic polymers, styrene polymers, polyamides, polyimides, epoxies, polycarbonates, polyurethanes, polyesters, phenolic resins and melamine-formaldehyde resins.

The organic polymers that are particularly well suited for use in making coatings for cables are:
  commercially available thermoplastic and crosslinked polyethylenes with densities from 890 to 960 g/litre, copolymers of ethylenes of this class with acrylic and vinyl other olefin monomers, terpolymers of ethylene, propylene and diene monomers, so-called thermoplastic vulcanisates where one component is crosslinked while the continuous phase is thermoplastic and variants of this where all of the polymers are either thermoplastic or crosslinked by either peroxide, radiation or so-called silane processes.

Compositions of the invention may be formed about a conducting element or plurality of elements by extrusion (including co-extrusion with other components) or by application of one or more coatings.

As noted, the organic polymer chosen will in part depend upon the intended use of the composition. For instance, in certain applications a degree of flexibility is required of the composition (such as in electrical cable coatings) and the organic polymer will need to be chosen accordingly based on its properties when loaded with additives. Polyethylenes and ethylene propylene elastomers have been found to be particularly useful for compositions for cable coatings. Also in selecting the organic polymer account should be taken of any noxious or toxic gases which may be produced on decomposition of the polymer. The generation of such gases may be more tolerable in certain applications than others. Preferably, the organic polymer used is halogen-free.

As noted the polymer base composition may include a silicone polymer. However, in this case the organic polymer would usually be present in the polymer base composition in a significant excess when compared with the silicone polymer. Thus, in the polymer base composition the weight ratio of organic polymer to silicone polymer may be from 5:1 to 2:1, for instance from 4:1 to 3:1. In terms of weight percentage, if present, the silicone polymer might generally be present in an amount of from 2 to 15% by weight based on the total weight of the formulated fire resistant composition. When a combination of organic and silicone polymers are used, high concentrations of silicone polymer can present processing problems and this should be taken into account when formulating compositions in accordance with the present invention.

The composition of the invention typically comprises at least 15% by weight based on the total weight of the composition of a polymer base composition comprising at least 50% by weight of an organic polymer.

The upper limit for the amount of polymeric components in the fire resistant composition tends to be influenced by the desired properties of the formulated composition. If the amount of the polymeric components exceeds about 60% by weight of the overall composition, it is unlikely that a cohesive, strong residue will be formed during a fire situation. Thus, the base composition generally forms from 15 to 60%, preferably from 20 to 50%, by weight of the formulated fire resistant composition.

The organic polymer is present in the polymer base composition in an amount of at least 50% by weight. This facilitates loading of the polymeric base composition with the additional components without detriment to the processability of the overall composition. As noted the polymer base composition may include a silicone polymer. However, in this case the organic polymer would usually be present in the base composition in a significant excess when compared with the silicone polymer.

On exposure of the composition of the invention to an elevated temperature experienced under fire conditions (to 1000° C.) the residue remaining will generally constitute at least 40%, preferably at least 55% and more preferably at least 70% by weight of the composition before pyrolysing. Higher amounts of residue are preferred as this may improve the ceramic strength at all temperatures.

The compositions of the present invention may be provided in a variety of different forms, including:
1. As a sheet, profile or complex shape. The composition may be fabricated into these products using standard polymer processing operations, eg extrusion, moulding (including hot pressing and injection moulding). The products formed can be used in passive fire protection systems. The composition can be used in its own right, or as a laminate or composite with another material (for example, plywood, vermiculite board or other). In one application the composition may be extruded into shapes to make seals for fire doors. In the event of a fire, the composition is converted into a ceramic thus forming an effective mechanical seal against the spread of fire and smoke.
2. As a pre-expanded sheet or profile. This form has additional benefits compared with the above, including reduced weight and the capacity for greater noise attenuation and insulation during normal operating conditions.
3. As a mastic material which can be applied (for example from a tube as per a conventional silicone sealant) as a seal for windows and other articles.
4. As paint, or an aerosol-based material, that could be sprayed or applied by with a brush.

Specific examples of passive fire protection applications where this invention may be applied include but are not limited to firewall linings for ferries, trains and other vehicles, fire partitions, screens, ceilings and linings coatings for building ducts, gap fillers (i.e. mastic applications for penetration), structural fire protection [to insulate the structural metal frame of a building to allow it to maintain its required load bearing strength (or limit the core temperature) for a fixed period of time], fire door inserts, window and door seals, intumescent seals, and compounds for use in electrical boxes, in fittings, straps, trays etc that are attached to or used to house cables or similar applications.

Another area of application is in general engineering. Specific areas of genera) engineering, where passive fire protection properties are required, include transportation (automotive, aerospace, shipping), defence and machinery. Components in these applications may be totally or partially subject to fire.

When totally subject to fire, the material will transform to a ceramic, thereby protecting enclosed or separated areas. When partially subjected to fire, it may be desirable for a portion of the material to transform to ceramic, being held in place by the surrounding material that has not transformed to a ceramic. Applications in the transport area may include panelling (e.g. in glass fibre reinforced thermoplastic or thermoset composites), exhaust, engine, braking, steering, safety devices, air conditioning, fuel storage, housings and many others. Applications in defence would include both mobile and non-mobile weapons, vehicles, equipment, structures and other areas. Applications in the machinery area may include bearings, housing barriers and many others.

The compositions of the present invention are especially useful as coatings for the production of cables for example they can be used for insulation or sheathing layers. The compositions are therefore suitable for the manufacture of electrical cables that can provide circuit integrity in the case of fire.

DESCRIPTION OF THE DRAWINGS

FIGS. 1 and 2 show single and multiconductor cables 1, 10 respectively, which have an insulation layer 2, or layers 12 and having additional ceramifying layers 4, 14 of a composition in accordance with the invention. In both of these cable designs, the position of the insulation layer and the ceramifying layer in accordance with the invention can be interchanged depending on the role of the additional layer.

In the design of such cables the ceramic forming insulation layers can be extruded directly over conductors and the ceramifying layers extruded over an insulation layer or layers. Alternatively, they can be used as an interstice filler in multi-core cables, as individual extruded fillers added to an assembly to round off the assembly, as an inner layer prior to the application of wire or tape armour.

Figure 3:
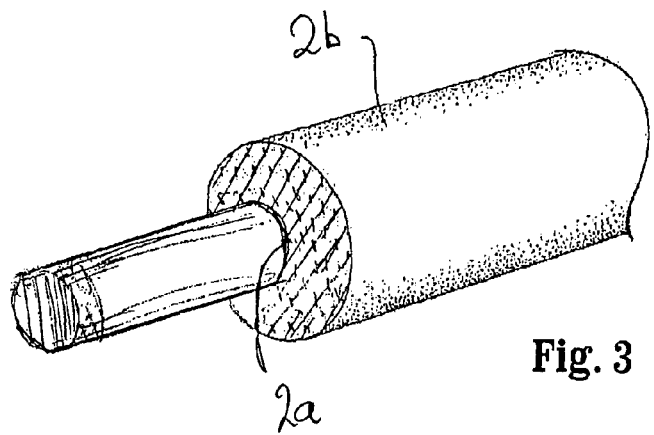
FIG. 3 is a perspective view of a particularly preferred embodiment of the cable of the invention in which the composition of the invention forms a single insulating layer about a conductive element.

FIG. 3 shows the simple cable design which may be used with the composition of the invention particularly the embodiment comprising ammonium polyphosphate in an amount of from 8 to 20% by weight. The composition in the invention forms an extruded insulation layer 2 about the conductor (1). The inner surface 2A of the insulation layer abuts the conductor and the outer surface 2B is free of further coatings.

Figure 4:
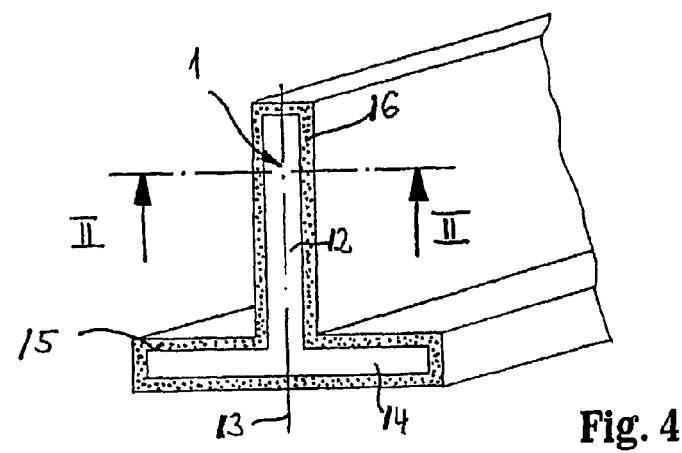
FIG. 4 is a perspective view of a fire performance article.
Figure 5:
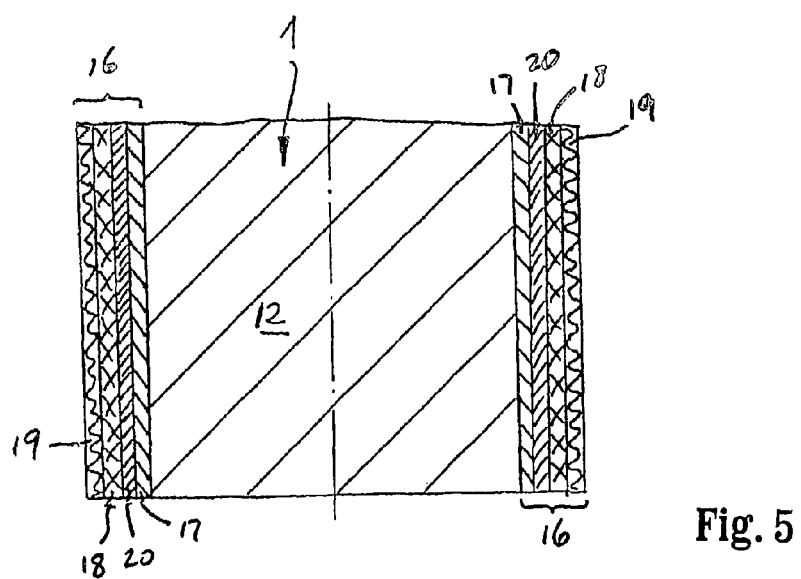
FIG. 5 is a cross section at position II shown in FIG. 4.

FIG. 4 shows a possible design for a fire performance article 1 and FIG. 5 shows a cross section at the position II in FIG. 4. The metal substrate 12 has a protective coating 16 which comprises at least one ceramifying layer (17-20) and may comprise one or more other layers such as glazing layer 18 or other ceramic forming layer.(19).

Figure 1:
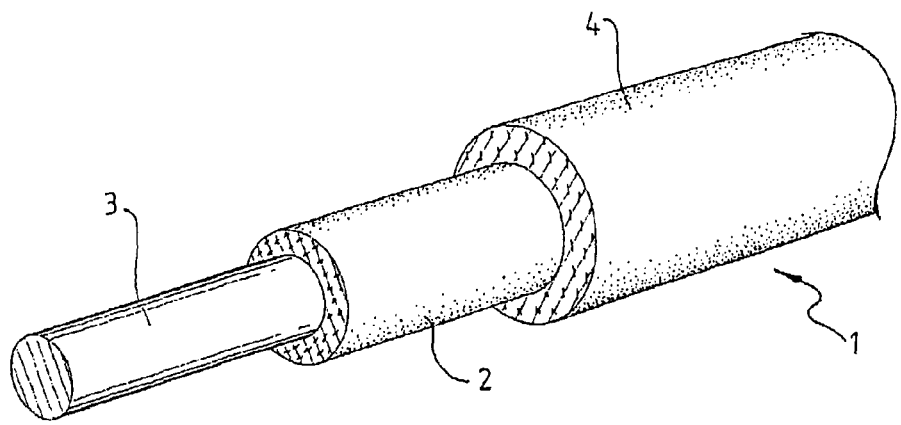
FIG. 1 is a perspective view of a cable having a ceramic forming insulation layer in accordance with the invention.
Figure 2:
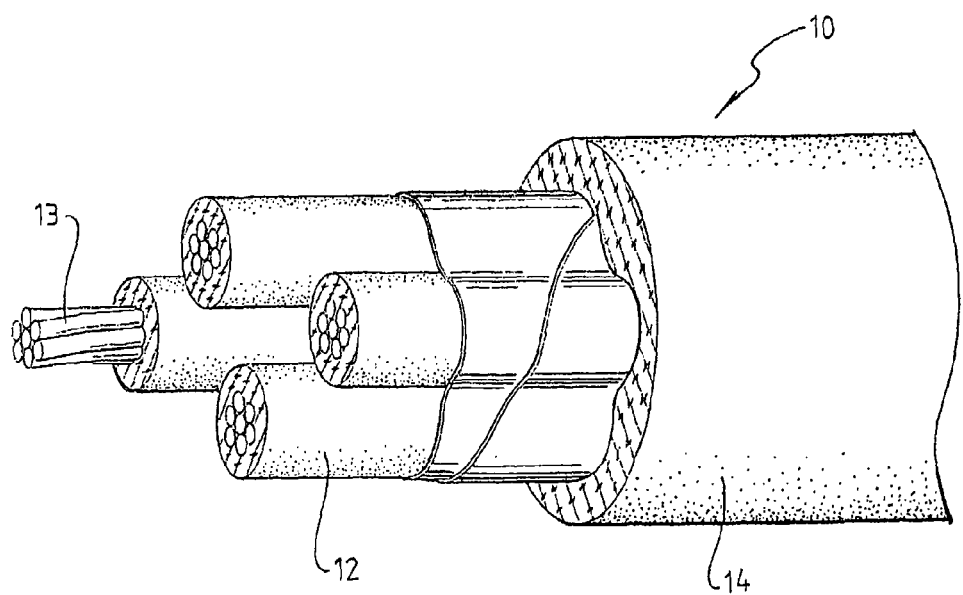
FIG. 2 is a perspective view of a multiconductor cable in which compositions of the invention are used as a sheath.

In the first embodiment of the cable of the invention as shown for example in FIG. 1 a functional element such as copper conductor is surrounded by a ceramifying insulation composition which forms a relatively weak ceramic which in turn is surrounded by a ceramifying composition in accordance with the invention for forming a fire resistant ceramic under fire conditions the composition comprising:

(i) at least 10% by weight of mineral silicate;
(ii) from 8% to 40% by weight of at least one inorganic phosphate that forms a liquid phase at a temperature of no more than 800° C.; and
(iii) at least 15% by weight based on the total weight of the composition of a polymer base composition comprising at least 50% by weight of an organic polymer;

wherein under fire conditions a rectangular test specimen of the ceramifying composition undergoes less than a 10% change in linear dimension along its length.

Compositions in accordance with the current invention are well suited for use imparting fire resistance to structures and components. We have discovered through extensive evaluation that components that melt at temperatures below 1,000° C. and hence form liquid phases can be beneficial in forming strong and stable ceramics, but their electrical conductivity is invariably high. This causes test cables, particularly multi-core cables, to fail due to the leakage of current through the insulation exceeding the capacity of the fuse or other circuit protection. There are many prior art examples where the strength of the ceramic was given higher importance and the resistivity was neglected. We have solved this problem by having a fusible component that provides only a transitory liquid phase, and which is converted (in the presence of a mineral silicate) to a crystalline solid at higher temperatures, providing a material which consequently has a much lower electrical conductivity at high temperature than compositions that still have a liquid phase present under these conditions.

Compositions may be suitable for use as the sole insulation layer on electric cables particularly where they exhibit suitable high electrical resistance at elevated temperature. In this aspect we have found composition comprising from 8 to 20% by weight of APP to be particularly advantageous. For those compositions that do not meet this requirement, it may be desirable to incorporate an additional layer that is electrically insulative at high temperature to ensure circuit integrity.

For instance, a composition which imparts thermal resistance and/or provides a physical barrier at elevated temperature but which becomes electrically conducting may be provided about a layer adapted to provide electrical insulation.

In a particularly preferred embodiment of a cable in accordance with the invention there is another layer of a ceramifying material, axially inward from a strong ceramifying material described in accordance with the composition of the invention. The axially inward layer may be of a range of types and may be a second layer in accordance with the composition of the present invention. It is particularly preferred, however, that in the cable in accordance with this embodiment that the layer axially inwards of a layer in accordance with a composition of the present invention is of the type described in our co pending International Patent Application PCT/AU03/01383 the contents of which are herein incorporated by reference.

The use of an insulation layer of this type, that forms a self-supporting ceramic on exposure to fire, in combination with a layer (preferably an outer layer) made from compositions in accordance with the current invention typically has the advantage of providing a mechanically stronger coating over the conductor after exposure to fire.

The resulting cable is more likely to remain functional in a fire and when subjected to the mechanical shocks and/or forces (e.g. from strong gas currents and/or water spray) associated with fire scenarios.

However, the composition of the invention may also be used in combination with ceramifying compositions which provide inferior mechanical strength at temperatures encountered under fire conditions. Thus on exposure to elevated temperatures, compositions in accordance with the present invention may form a physically strong coherent layer over an insulating layer, which is degraded to inorganic residues that are not coherent, around an electrical conductor and therefore do away with the need to use physical supports.

The ceramifying insulating layer and layer in accordance with the composition of the invention may be applied by conventional means such as extrusion. This extrusion of the composition of the invention may be carried out in a conventional manner using conventional equipment. The thicknesses of the layers of insulation will depend upon the requirements of the particular standard for the size of conductor and operating voltage. Typically the insulation will have a total thickness from 0.6 to 3 mm. For example, for a 35 $mm^2$ conductor rated at 0.6/1 kV to Australian Standards would require an insulation thickness of approximately 1.2 mm. The cable may include other layers such as a cut-resistant layer and/or sheathing layer.

In a further embodiment of the cable of the invention a copper conductor is surrounded by a filled organic polymer layer which decomposes to deposit a loosely packed electrically insulating inorganic powder (e.g. silicon dioxide, aluminium oxide, magnesium oxide) in the resulting gap between the conductor and the ceramifying layer of the composition of the present invention on exposure to temperatures encountered under fire conditions.

The inorganic phosphate component provides a transitional liquid phase under fire conditions and entraps pores of a gas phase formed as a result of decomposition of the ceramifying composition on exposure to elevated temperature experienced under fire conditions. At temperatures over 800° C. the inorganic phosphate forms part of the ceramic material.

Furthermore, on exposure to elevated temperature experienced under fire conditions the compositions may also yield residue which is coherent and has good mechanical strength, even after cooling. The residue is self-supporting and will be retained in its intended position rather than fracturing and being displaced, for example, by mechanical shock. In this context the term "residue" is hereinafter intended to describe the product formed when the composition is exposed to an elevated temperature, experienced under fire conditions. Generally an elevated temperature of 1000° C. for 30 minutes is sufficient to covert fire resistant compositions of the invention to residue. Desirably, as well as providing thermal insulation and/or a coherent physical barrier or coating, compositions in accordance with the present invention may also exhibit the required electrical insulating properties at elevated temperatures.

The present invention describes materials that typically meet the requirements of providing no substantial change in shape on exposure to an elevated temperature experienced under fire conditions, producing ceramics that are self-supporting and have acceptable mechanical strength.

It has been found that compositions in accordance with the present invention may form a coherent ceramic product when exposed to elevated temperatures and that this product exhibits desirable physical and mechanical properties. The ceramic formed on exposure of compositions of the present invention to an elevated temperature experienced under fire conditions has a flexural strength of at least 0.3 MPa, preferably at least 1 MPa and more preferably at least 2 MPa. It is a distinct advantage that the compositions are self-supporting, i.e. they remain rigid and do not undergo heat induced deformation or flow. They also undergo little, if any, shrinkage on exposure to an elevated temperature experienced under fire conditions, whether the heating rate experienced is relatively fast or slow. Typically rectangular test specimens will undergo changes in linear dimension along the length of the specimen of less than 20% and preferably less than 10%. Generally speaking the limit on contraction is more important, preferably this is less than 5% and more preferably less than 1% and most preferably essentially none. In the case of expansions, any expansion is less than 20%, preferably less than 10% and more preferably less than 5% and most preferably less than 3%. Changes in dimensions are also influenced by additional factors including the thermal degradation behaviour of the components, particularly the different behaviour of organic components and can vary from shrinkage to expansion, (caused by gases escaping from decomposing components of the composition) with expansion having the most pronounced effect (in a percentage change basis) in the least constrained dimension such as the thickness (height) of the specimen. Thus one skilled in the art can select the components of the composition to achieve a range of outcomes under the expected heating conditions, for example: no significant change in linear dimensions, no substantial change in all three dimensions (net shape retention), an increase in linear dimensions of under 5%, etc.

It is a further advantage, of the compositions of the present invention, that this type of coherent product with desirable physical and mechanical properties can be formed at temperatures well below 1000° C. The compositions of the invention may be used in a variety of applications where it is desired to impart fire resistance to a structure or component. The compositions are therefore useful in passive fire protection systems.

As explained, preferably the compositions exhibit minimal linear dimensional change after exposure to the kind of temperatures likely to be encountered in a fire. By this is meant that the maximum linear dimensional change in a product formed from a composition in accordance with the present invention is less than 20%, preferably less than 10%, more preferably less than 5% and most preferably less than 1%. In some cases net shape retention is the most preferred.

The invention will now be described with reference to the following non-limiting examples.

EXAMPLES

The specification and claims refer to terms which are defined below along with test methods for their determination. The tests to determine these properties should ideally be conducted on specimens 30 mm×13 mm×2 mm (approximately), although in some examples specimens with somewhat different dimensions have been used. The properties and conditions are:

Slow firing conditions. Heating test specimens from room temperature to 1000° C. at a temperature increase rate of 12° C./min followed by holding at 1000° C. for 30 minutes. These conditions are representative of 'exposure to an elevated temperature experienced under fire conditions'.

Fast firing conditions. Placing test specimens in a preheated furnace at 1000° C. and maintaining the furnace at that temperature for 30 minutes. In the examples, some of the compositions have been exposed to these firing conditions to illustrate the effect of different firing conditions on some of the measured properties. These conditions are representative of exposure that may be achieved under a scenario of very rapid heating.

Change in linear dimensions. The change in linear dimensions along the length of the specimen. The method for determining the change in linear dimensions is by measuring the length of the specimen before firing and upon cooling after being subjected to either fast firing conditions or slow firing conditions. An expansion of the specimen caused by firing is reported as a positive change in linear dimension and a contraction (shrinkage) as a negative change in linear dimension. It is quoted as a percent change.

Flexural strength. The flexural strength of the ceramic is determined by heating the test specimen under slow firing conditions and, upon cooling, carrying out the determination by three-point bending of the span length of 18 mm using a loading cross head speed of 0.2 mm/minute.

Residue. The material remaining after a compositions has been subjected to elevated temperatures experienced in a fire. In the context of this invention, those conditions are simulated heating the composition from room temperature to 1000° C. followed by holding at 1000° C. for 30 minutes.

Self-supporting. Compositions that remain rigid and do not undergo significant heat induced deformation or flow. Determined by placing a specimen on a rectangular piece of refractory so that the long axis is perpendicular to the edge of the refractory block and a 13 mm portion is projecting out over the edge from the block, then heating under slow firing conditions and examining the cooled specimen. A self-supporting specimen remains rigid, and is able to support its own weight without significantly bending over the edge of the support. Typically any bending over the edge of the block will provide an angle to the original position of less than 15 degrees.

Net shape retention. Compositions that undergo no substantial change in shape when heated. This will depend in part on the shape and dimensions of the specimen being tested and the firing conditions used.

Examples in accordance with the invention were also found to be self-supporting and to retain the shape the specimen had prior to its exposure to elevated temperatures.

Example 1

A two-roll mill was used to prepare the compositions denoted A, B, C and D in Table 1. In each case, the ethylene-propylene (EP) polymer was banded on the mill (10-20° C.) and other components were added and allowed to disperse by separating and recombining the band of material just before it passed through the nip of the two rolls. When these were uniformly dispersed, the peroxide was added and dispersed in a similar manner.

Flat rectangular sheets of about 1.7 mm thickness were fabricated from the milled compositions by curing and moulding at 170° C. for 30 minutes under a pressure of approximately 7 MPa.

Rectangular sheet specimens with dimensions 30 mm×13 mm×1.7 mm (approx) were cut from the moulded sheets and fired under slow firing conditions (heating from room temperature to 1000° C. at a temperature increase rate of 12° C./min followed by holding at 1000° C. for 30 minutes) or fast firing conditions (putting sheets into a pre-heated furnace at 1000° C. and maintaining at that temperature for 30 minutes). After firing, each sample took the form of a ceramic. The change in linear dimensions caused by firing was determined by measuring the length of the specimen before and after firing. An expansion of the specimen caused by firing is reported as a positive change in linear dimensions and a contraction (shrinkage) as a negative change in linear dimensions.

TABLE 1

Compositions A, B, C and D

| | Composition (weight %) | | | |
|---|---|---|---|---|
| | A | B | C | D |
| EP Polymer | 18 | 18 | 18 | 18 |
| EVA Polymer | 4.5 | 4.5 | 4.5 | 4.5 |
| Ammonium Polyphosphate | 27 | 27 | 27 | 27 |
| Talc | 25 | 40 | 25 | — |
| Mica | — | — | — | 25 |
| Alumina Trihydrate | 15 | — | — | 15 |
| Magnesium Hydroxide | — | — | 15 | — |
| Other Additives (Stabilisers, Coagent, Paraffinic Oil) | 8 | 8 | 8 | 8 |
| Peroxide | 2.5 | 2.5 | 2.5 | 2.5 |
| TOTAL | 100 | 100 | 100 | 100 |
| Firing Condition | Slow  Fast | Slow | Slow | Slow |
| Change in linear dimensions when ceramified - % | −2.9  2.0 | 0.2 | 6.7 | −2.1 |

On firing at 1000° C., the compositions A, B, C and D transform into hard and strong ceramics that retain the initial shape with minimum dimensional changes.

Example 2

Specimens made from compositions A, B, C and D were tested and found to be self-supporting. They did not fuse and produced coherent self-supporting porous ceramics that retained the shape of the specimen prior to exposure to elevated temperatures. Visual inspection revealed that the unsupported span of each specimen remained in place without bending over the edge of the refractory support due to its own weight.

Example 3

A copper conductor of 1.5 mm$^2$ cross section was insulated with a layer of 0.5 mm wall thickness of a ceramifiable composition E (Table 2). A second layer of the composition A (Table 1) was extruded directly over the layer of composition E to provide a composite insulation wall thickness of 1.0 mm. This insulated conductor was twisted together with three other insulated conductors made in the same way to form an assembly of four insulated conductors.

The assembly of twisted, insulated conductors was then sheathed with a commercially available halogen-free, low-smoke, low-toxicity thermoplastic compound, forming a finished cable. Three segments of this cable were then subjected to the circuit integrity test of AS/NZS3013:1995.

The test requires the cable segments to be energised at 240 Volts and then subjected to a furnace test of 2 hours duration to reach a final temperature of 1,050° C., and then subjected to a water jet spray for 3 minutes.

Three segments of cable made and tested as described were able to maintain circuit integrity and thus meet the requirements of the circuit integrity test of AS/NZS3013:1995. A comparative cable was produced and subjected to the same test using only insulating material of composition E and was found to perform unsatisfactorily.

TABLE 2

Composition E

| | wt. % |
|---|---|
| EP Polymer | 19 |
| EVA Polymer | 5 |
| Clay | 10 |
| Talc | 10 |
| Mica | 20 |
| Alumina trihydrate | 10 |
| Calcium Carbonate | 10 |
| Silicone Polymer | 5 |
| Other Additives, | 8.4 |
| Peroxide | 2.6 |
| TOTAL | 100 |

Example 4

Compositions given in Table 3 were prepared by mixing the polymers with the respective filler and additive combination using a two roll mill as described earlier in Example 1. Compositions F to N are practical embodiments of the present invention. Compositions O and P are comparative examples. Specimens of nominal dimensions 30 mm×13 mm×1.7 mm were made from these compositions by curing and moulding at 170° C. for 30 minutes under a pressure of approximately 7 MPa. One set of specimens was fired under the slow firing conditions described in Example 1. For each composition, the change in linear dimension along the length of the specimen caused by firing was determined by measuring the length before and after firing and the flexural strength of the resultant ceramic was determined by three-point bending of a span length of 18 mm using a loading cross head speed of 0.2 mm/min. Another set of specimens was fired placing them along the edge of a refractory block in the manner described in Example 2 and inspected after firing to determine whether they were able to self support during firing by remaining without bending over the edge of the supporting refractory block. The results of all the tests are given in Table 3.

The results for compositions F to N show that, when heated up to 1000° C., the compositions of the present invention undergo less than 10% change in linear dimensions and the ceramic residue formed has a flexural strength in excess of 2 MPa. The comparison of the comparative example O with composition A (Table 1) shows that, replacing the low melting inorganic phosphate component (ammonium polyphosphate) in composition A with zinc borate, which also produces a liquid phase at a similarly low temperature, results in a shrinkage well in excess of 10% and the ceramic residue formed looses its ability to be self-supporting. The comparative example P, which does not contain any mineral silicate, results in a ceramic residue that is not self-supporting and has a flexural strength much less than the preferred value of at least 1 Mpa.

Example 5

This example compares the performance of the compositions of the invention with a composition of US Patent US2003/0031818 (Horacek).

A two-roll mill was used to prepare the first composition from US Patent US2003/0031818 denoted "Q" in Table 4, and also a composition of this application, denoted "R" in Table 4. In each case, the EP polymer was banded on the mill (40-50° C.) and other components were added and allowed to disperse by separating and recombining the band of material just before it passed through the nip of the two rolls. When these were uniformly dispersed, the peroxide was added and dispersed in a similar manner.

Flat rectangular sheets of about 1.7 mm thickness were fabricated from the milled compositions by curing and moulding at 170° C. for 30 minutes under a pressure of approximately 7 MPa.

Rectangular sheet specimens with dimensions 30 mm×13 mm×1.7 mm (approx) were cut from the moulded sheets and fired under fast firing conditions (insertion into a furnace maintained at 1000° C. followed by holding at 1000° C. for 30 minutes). After firing, each sample took the form of a ceramic. Visual examination confirmed that while composi-

TABLE 3

Test results for compositions F to P

| | F | G | H | I | J | K | L | M | N | O | P |
|---|---|---|---|---|---|---|---|---|---|---|---|
| EP Polymer | 18 | 18 | 18 | 18 | 18 | 18 | 18 | 18 | 18 | 18 | 18 |
| EVA Polymer | 4.5 | 4.5 | 4.5 | 4.5 | 4.5 | 4.5 | 4.5 | 4.5 | 4.5 | 4.5 | 4.5 |
| Ammonium polyphosphate | 35 | 10 | 27 | 27 | 27 | 27 | 27 | 27 | 27 | — | 27 |
| Zinc Borate | — | — | — | — | — | — | — | — | — | 27 | — |
| Talc | 25 | 40 | — | — | 25 | 25 | 25 | 10 | 15 | 25 | — |
| Calcined clay | — | — | 25 | — | — | — | — | — | — | — | — |
| Wollastonite | — | — | — | 25 | — | — | — | — | — | — | — |
| Alumina trihydrate | 7 | 17 | 15 | 15 | — | — | — | 30 | 25 | 15 | — |
| CaCO$_3$ | — | — | — | — | — | — | 15 | — | — | — | 40 |
| MgCO$_3$ | — | — | — | — | — | 15 | — | — | — | — | — |
| BaCO$_3$ | — | — | — | — | 15 | — | — | — | — | — | — |
| Process oil | 5.6 | 5.6 | 5.6 | 5.6 | 5.6 | 5.6 | 5.6 | 5.6 | 5.6 | 5.6 | 5.6 |
| Additives | 2.4 | 2.4 | 2.4 | 2.4 | 2.4 | 2.4 | 2.4 | 2.4 | 2.4 | 2.4 | 2.4 |
| Peroxide | 2.5 | 2.5 | 2.5 | 2.5 | 2.5 | 2.5 | 2.5 | 2.5 | 2.5 | 2.5 | 2.5 |
| TOTAL | 100 | 100 | 100 | 100 | 100 | 100 | 100 | 100 | 100 | 100 | 100 |
| Firing Condition | Slow | Slow | Slow | Slow | Slow | Slow | Slow | Slow | Slow | Slow | Slow |
| Change in linear dimensions | −3.1 | −1.8 | 6 | −2.5 | 5.5 | 6.7 | 6.3 | 2.3 | 1.6 | −27.2 | 6.4 |
| Strength of ceramic residue (MPa) | 6.20 | 3.82 | 2.9 | 2.3 | 2.65 | 3.43 | 4.20 | 2.64 | 3.86 | — | 0.76 |
| Able to self support | Yes | Yes | Yes | Yes | Yes | Yes | Yes | Yes | Yes | No | No |

Note:
A negative value for change in linear dimensions indicates a shrinkage and a positive value indicates an expansion tion "R" had formed a ceramic residue that had maintained its original dimensions, composition "Q" had not maintained its shape and underwent a significant change in excess of +20%. A test formed under slow firing conditions showed that composition "R" was self supporting and composition "Q" was not. The performance of composition "Q" was considered to be inadequate for use as a cable insulating material as it was not self-supporting and did not maintain shape and dimensions, and was therefore likely to fail in any fire test. In contrast composition "R" showed net shape retention (excellent dimensional stability).

TABLE 4

Compositions Q and R

| | Composition Q | | Composition R | |
|---|---|---|---|---|
| | PHR | % | | % |
| EP Polymer | 100 | 26.95 | EP Polymer | 18.50 |
| LDPE | 10 | 2.70 | EVA Polymer | 4.70 |
| Clay | 100 | 26.95 | Ammonium Polyphosphate | 13.50 |
| Pentaeryithritol | 11.11 | 2.99 | | |
| Melamine | 22.22 | 5.99 | Talc | 20.00 |
| Ammonium Polyphosphate | 66.67 | 17.97 | Clay | 7.50 |
| | | | Alumina Trihydrate | 15.00 |
| Paraffin wax | 3.00 | 0.81 | Calcium Carbonate | 7.50 |
| Paraffin oil | 50.00 | 13.48 | Process oil | 5.80 |
| Stearic acid | 2.00 | 0.54 | Coupling agent | 1.00 |
| Zinc oxide | 2.00 | 0.54 | Process aid | 2.50 |
| Stabiliser | 1.00 | 0.27 | Stabiliser | 1.40 |
| Coupling agent | 1.00 | 0.27 | Peroxide | 2.60 |
| Peroxide | 2.00 | 0.54 | | |
| Total | 371 | 100.00 | | 100.00 |

Example 6

This example relates to preparation of thermoplastic compositions in accordance with the invention. Compositions shown in Table 5 were prepared.

TABLE 5

| | Thermoplastics | | | | |
|---|---|---|---|---|---|
| | S PVC | T PS | U TPV | V polychloroprene | W EDPM |
| PVC Polymer | 25 | | | | |
| DOP plasticizer | 2.4 | | | | |
| PS | | 30 | | | |
| TPV | | | 29.8 | | |
| Polychloroprene | | | | 29.8 | |
| EPDM | | | | | 30 |
| Process Aids | 1.4 | | 0.7 | 0.4 | |
| Additives | 1.2 | | | | |
| APP | 28.2 | 28.2 | 28.0 | 28.1 | 28.2 |
| talc | 26.1 | 26.1 | 25.9 | 26.0 | 26.1 |
| ATH | 15.7 | 15.7 | 15.6 | 15.7 | 15.7 |
| Total | 100 | 100 | 100 | 100 | 100 |
| Firing conditions | Slow | Slow | Slow | Slow | Slow |
| Change in linear dimensions | −5.9 | 3.0 | −5.3 | 3.0 | 5.6 |
| Strength of ceramic residue (MPa) | 0.8 | 0.9 | 2.3 | 2.5 | 0.3 |
| Able to self support | yes | yes | yes | yes | yes |

Compositions S to W in Table 5 were prepared by mixing the polymers with the respective filler and additive combination using a Haake Reocord Batch Mixer. Composition S was based on PVC powder (Australian Vinyls K62R2) mixed at a temperature of 170° C., at 30 rpm for approximately 10 minutes. Composition T was based on a powdered polystyrene (PS, Austrex 103) and was mixed at 180° C., at 40 rpm for 1 to 2 minutes until the torque stabilized, and then for a further 5 minutes. Composition U was based on a thermoplastic vulcanizate (TPV, Santoprene 591-73), with calcium stearate and paraffin used as processing aids premixed with the TPV pellets and fillers respectively, and then mixed in the same way as for the polystyrene composition. Example V was based on a polychloroprene (Neoprene TRT). This composition was not crosslinked. It was mixed at a temperature of 180° C., but otherwise per Composition U. Example W was based on an ethylene propylene diene polymer (Nordel 3745). This composition was not crosslinked. It was mixed at a temperature of 170° C. but other wise per Composition U.

3 mm thick plaques were compression moulded from these compositions at 155 to 180° C. for approximately 10 minutes under a pressure of approximately 10 MPa. Specimens were then cut from the plaques. One set of specimens was fired under the slow firing conditions and tested as described above. All these compositions based on thermoplastics produced self-supporting ceramics after slow firing with less than 10% change in linear dimensions and flexural strength greater than 0.3 MPa.

Example 7

This example relates to preparation of crosslinked rubbers in accordance with the invention. Compositions shown in Table 6 were prepared.

TABLE 6

| | Rubbers | |
|---|---|---|
| | X SBS | Y NBR |
| SBS | 35 | |
| NBR | | 35 |
| Process oil | 6 | 6 |
| Additives | 3 | 3 |
| Peroxide | 4 | 4 |
| APP | 17 | 17 |
| talc | 22 | 22 |
| ATH | 13 | 13 |
| Total | 100 | 100 |
| Firing conditions | Slow | Slow |
| Change in linear dimensions | −6.4 | −5.8 |
| Strength of ceramic residue (MPa) | 2.8 | 4.8 |
| Able to self support | yes | yes |

The rubber compositions in Table 6 were prepared as follows.

Composition X is based on an SBS rubber (Kraton D102CS), which is a clear linear block copolymer based on styrene and butadiene with bound styrene of 29.5% mass and density of 0.94 g/cm$^3$ The SBS was softened on a two-roll mill heated to about 50° C. and all additives were added gradually until a homogenous mixture was obtained. Dicumyl peroxide (DCP) was then added to this mixture on the two roll mill.

Composition Y is based on an NBR rubber from Nippon Zeon which is a block copolymer with 41% acrylonitrile. The composition was prepared by mixing the polymer with the respective filler and additive combination in an internal mixer at 40° C.

Plaques were compression moulded from these compositions at 175° C. for approximately 25 minutes under a pressure of approximately 7 MPa. Specimens were then cut from the plaque, fired under the slow firing conditions and tested as above.

These compositions based on crosslinked rubbers produced self-supporting ceramics after slow firing with less than 10% change in linear dimensions and greater than 2 MPa flexural strength.

Example 8

This example relates to preparation of polymer emulsion/dispersion compositions in accordance with the invention. Compositions shown in Table 7 were prepared.

TABLE 7

|  | Emulsion/dispersion | | |
| --- | --- | --- | --- |
|  | AA PVAc | AB EAA | AC SBA |
| Vinyl acetate homopolymer | 34 | | |
| Ethyl Acrylate/Acrylonitrile | | 30 | |
| Styrene butyl acrylate | | | 30 |
| Process oil | 6 | 6 | |
| APP | 20 | 21 | 28.2 |
| talc | 24 | 26 | 26.1 |
| ATH | 16 | 17 | 15.7 |
| Total | 100 | 100 | 100 |
| Firing conditions | Slow | Slow | Slow |
| Change in linear dimensions | −4.6 | −1.5 | −1.3 |
| Strength of ceramic residue (MPa) | 6.3 | 5.3 | 3.3 |
| Able to self support | yes | yes | yes |

The aqueous dispersion formulations in Table 7 were prepared as follows.

Composition AA was based on Acropol 63-075 (from Nuplex Resins) which is a vinyl acetate homopolymer emulsion with 55% solid content and viscosity of 2500 cP. Composition AB was based on Primal NWB-56 (from Rohm and Haas) which consists of ethyl acrylate and acrylonitrile monomers. Composition AC was based on Texicryl 13-092 (from Nuplex Resins) which is a styrene butyl acrylate (co-polymer) dispersion with 50% solid content and viscosity of 500 cP. In all cases the polymer content in the formulations is based on the solid content of the respective emulsions/dispersions.

The inorganic components (APP, talc and ATH) were first hand mixed and, when mixed properly, the process oil was added. The emulsion/dispersion was then added to the mixture and thoroughly mixed using an overhead mixer at medium speed with a dispersion head attachment, for about 5 minutes to produce a paste like material. The paste was cast on a PET sheet and air dried at room temperature for 3 days. Samples were then cut from the cast plaque and fired under the slow firing conditions as described in Example 1 and tested as described in Example 4.

All these compositions based on emulsions/dispersions of polymers produced self supporting ceramics after slow firing with less than 10% change in linear dimensions and greater than 2 MPa flexural strength.

Example 9

This example relates to preparation of polyimide (PI) composition in accordance with the invention. Compositions in Table 8 were prepared.

TABLE 8

|  | Polyimide AD PI |
| --- | --- |
| Polyimide | 24 |
| APP | 26 |
| talc | 32 |
| ATH | 18 |
| Total | 100 |
| Firing conditions | Slow |
| Change in linear dimensions | approx −15% |
| Strength of ceramic residue | strong |
| Able to self support | yes |

Polyimide was prepared by the following method:
1. 0.04 moles (8.01 g) of oxydianaline bis(4-aminophenyl) ether polymer (ODA) was dissolved in 25 g of N,N-dimethyl acetamide (DMAc) and stirred for 1 hour (a clear solution was obtained.)
2. 0.04 moles (8.72 g) of pyromellitic dianhydride (PMDA) were added to the above solution and the mixture was stirred for 30 minutes. Another 20 g of DMAc was added to this mixture to facilitate the mixing. Mixture 15 was stirred until a homogenous and viscose mixture (poly (amic acid) pre-polymer) was obtained
3. The inorganic components were mixed properly and the mixture was wet with 25 g of DMAc.

The inorganic components were then gradually added to the pre-polymer to give the composition AD in Table 8, which was then stirred for 45 minutes. The mixture was homogenous and viscose with a paint-like consistency.

After casting the pre-polymer based composition onto petri-dishes, samples were cured according to the following heat program: 100° C. for 1 hour, then 150° C. for 1 hour, then 200° C. for 45 minutes, then 250° C. for 1 hours, then cooled slowly in the oven overnight.

During heating the polyimide solution moved to the surface of the mixture and formed a thin brittle polymer layer. This PI composite was brittle.

Two pieces of PI samples were fired under the slow firing conditions as described in Example 1. The resulting ceramic shrank by an estimated 15%. It was self-supporting and strong.

Example 10

This example relates to preparation of thermosetting resins in accordance with the invention. Thermosetting resins shown in Table 9 were prepared.

TABLE 9

|  | Thermosetting Resins | | |
| --- | --- | --- | --- |
|  | AE epoxy | AF polyester | AG vinyl ester |
| epoxy monomer | 19.4 | | |
| cycloaliphatic anhydride hardener | 15.6 | | |
| polyester resin | | 21.6 | |
| vinyl esters | | | 23.6 |
| benzoyl peroxide | | 0.3 | 0.3 |
| APP | 26.2 | 31.5 | 40.5 |
| talc | 24.2 | 29.1 | 13.1 |
| ATH | 14.6 | 17.5 | 22.5 |
| Total | 100 | 100 | 100 |
| Firing conditions | Slow | Slow | Slow |

TABLE 9-continued

| | Thermosetting Resins | | |
|---|---|---|---|
| | AE epoxy | AF polyester | AG vinyl ester |
| Change in linear dimensions | −0.7 | −2.9 | −5.5 |
| Strength of ceramic residue (MPa) | 5.0 | 3.3 | 4.0 |
| Able to self support | yes | yes | yes |

Composition AE was prepared by first mixing an epoxy monomer (Huntsman Araldite CY179) with a cycloaliphatic anhydride (Huntsman Aradur HY906). This mixture was preheated to 80° C., then the talc, aluminium trihydrate and ammonium polyphosphate were added with continuous stirring. The uncured mixture, in the form of a paste, was compressed into an aluminium plate mould (3 mm thick,×100 mm×100 mm) and cured for 3 h at 120° C., and then postcured for 16 h at 160° C.

Composition AF was prepared by mixing a polyester resin (Huntsman Estarez 1030 PALSE) with benzoyl peroxide, talc, alumina trihydrate and ammonium polyphosphate. This mixture was stirred to form a smooth paste, which was compressed into an aluminium mold (100×100×3 mm thick) and cured at 50° C. for 12 h.

Composition AG was prepared by mixing vinyl ester resin (Huntsman Estarez 7222 PAS), benzoyl peroxide, talc, alumina trihydrate and ammonium polyphosphate. This mixture was stirred to form a smooth paste, which was compressed into an aluminium mould (100×100×3 mm thick) and cured at 35° C. for 18 h.

Test specimens were machined from the cured formulations, then fired under the slow firing conditions and tested as above.

These compositions produced self-supporting ceramics with linear shrinkage of less than 10% and flexural strength in excess of 2 MPa.

Example 11

This example relates to preparation of polyurethane (PU) foam compositions in accordance with the invention. The foams were of the composition shown in Table 10.

TABLE 10

| | Polyurethane Foams | |
|---|---|---|
| | AH flexible PU | AI rigid PU |
| Polyol (Daltoflex JC 88870) | 33.3 | |
| Polyol (Daltofoam MO 90400) | | 28.3 |
| Isocyanate (Suprasec 7114) | 26.7 | |
| Isocyanate (Suprasec 5005) | | 31.7 |
| APP | 15 | 15 |
| talc | 15 | 15 |
| ATH | 10 | 10 |
| Total | 100 | 100 |
| Firing conditions | Slow | Slow |
| Change in linear dimensions | −27.8 | −11.9 |
| Able to self support | yes | yes |

The foamed compositions in Table 10 were prepared by combining the inorganic components with the polyol component in a 1 litre beaker using a high torque mixer at 500 rpm. The isocyanurate component was then added and stirring was continued until the composition began to foam. The samples were allowed to cure for at least 72 hours at room temperature before cutting samples of approximately 30×15×15 mm using a band saw. One set of specimens was fired under the slow firing conditions and tested as described above. Due to the low density foamed nature of these materials, the strength of the ceramic was relatively low. In both cases the change in linear dimensions was less than 30% and the ceramics were self-supporting.

Example 12

A copper conductor of 1.5 mm² cross section was insulated with a single layer of 0.8 mm wall thickness of a ceramifiable composition R (Table 4). This insulated conductor was twisted together with three other insulated conductors made in the same way to form an assembly of four insulated conductors.

The assembly of twisted, insulated conductors was then sheathed with a commercially available halogen-free, low-smoke, low-toxicity thermoplastic compound, forming a finished cable. Segments of this cable were then subjected to the circuit integrity tests of:
AS/NZS3013:1995,
IEC 60331 2002
BS6387 Cat C, W, Z The AS/NZS3013 test requires the cable segments to be energised at 240 Volts and then subjected to a furnace test of 2 hours duration to reach a final temperature of 1,050° C., and then subjected to a water jet spray for 3 minutes.

Three segments of cable made and tested as described were able to maintain circuit integrity and thus meet the requirements of the circuit integrity test of AS/NZS3013:1995. The cable made with composition R as described above satisfactorily passed the requirements of the test.

The IEC 60331 test involves supporting a length of cable above a ribbon burner on earthed metal rings. The temperature of the burner is adjusted to 950° C. before the energised cable is placed in position over it, and the cable must withstand this exposure for three hours. The cable made with composition R as described above satisfactorily passed the requirements of the test.

The BS6387 Tests are in three parts, with the cat C being almost identical to the IEC60331 test, the cat Z being 15 minutes of 950° C. burner exposure with a mechanical shock every 30 seconds and the cat W being 15 minutes of 650° C. burner exposure followed by 15 minutes of simultaneous water spray and burner exposure. The cable made with composition R as described above satisfactorily passed the requirements of the tests.

The invention claimed is:

1. A ceramifying composition forming a fire resistant ceramic under fire conditions, the composition comprising:
   (i) at least 10% by weight based on the total weight of the composition of silicate mineral filler;
   (ii) from 8% to 40% by weight based on the total weight of the composition of at least one inorganic phosphate that forms a liquid phase at a temperature of no more than 800° C. selected from ammonium phosphate, ammonium polyphosphate and ammonium pyrophosphate;
   (iii) at least 15% by weight based on the total weight of the composition of a polymer base composition comprising at least 50% by weight of an organic polymer;
wherein the composition comprises less than 1% by weight of melamine and pentaerythritol, based on the total weight of the composition; and wherein said composition forms a self-supporting ceramic residue on exposure to an elevated temperature of 1000° C. for 30 minutes, which the residue comprises at least 40% by weight of the composition before pyrolysing.

2. A ceramifying composition forming a fire resistant ceramic under fire conditions, the composition consisting essentially of:
(i) at least 15% by weight, based on the total weight of the composition, of a polymer base composition comprising at least 50% by weight of an organic polymer;
(ii) 8-40% by weight based on the total weight of the composition of at least one inorganic phosphate that forms a liquid phase at a temperature of no more than 800° C., based on the total weight of the composition;
(iii) at least 10% by weight, based on the total weight of the composition, of silicate mineral filler; and
(iv) optionally additional inorganic filler in an amount of up to 30% by weight based on the total weight of the composition;
wherein the composition forms a self-supporting ceramic residue on exposure to an elevated temperature of 1000° C. for 30 minutes, which the residue comprises at least 40% by weight of the composition before pyrolysing.

3. A ceramifying composition according to claim 1 wherein on exposure to the elevated temperature experienced under fire conditions a rectangular test specimen of the ceramifying composition undergoes less than a 10% change in linear dimensions along its length.

4. A ceramifying composition according to claim 2 wherein on exposure to the elevated temperature experienced under fire conditions a rectangular test specimen of the ceramifying composition undergoes less than a 5% change in linear dimensions along its length.

5. A ceramifying composition according to claim 1 wherein on exposure to the elevated temperature experienced under fire conditions a rectangular test specimen of the ceramifying composition undergoes less than a 1% change in linear dimensions along its length.

6. A ceramifying composition according to claim 1 wherein inorganic components are present in an amount of at least 40% by weight based on the total weight of the composition.

7. A ceramifying composition according to claim 1 wherein inorganic components are present in an amount of at least 60% by weight based on the total weight of the composition.

8. A ceramifying composition according to claim 1 wherein inorganic components are present in an amount of at least 70% by weight based on the total weight of the composition.

9. A ceramifying composition according to claim 1 wherein the inorganic phosphate is ammonium polyphosphate present in an amount of from 20 to 40% by weight of the total composition.

10. A ceramifying composition according to claim 1 wherein the silicate mineral filler is present in an amount of at least 15% by weight of the total composition.

11. A ceramifying composition according to claim 1 wherein the composition further comprises an additional inorganic filler component comprising at least one compound selected from the group consisting of oxides, hydroxides and carbonates of aluminum, magnesium and calcium, the total of said additional inorganic filler constituting up to 20% by weight of the total ceramifying composition.

12. A ceramifying composition according to claim 11 wherein the additional inorganic filler comprises at least one compound selected from the group consisting of magnesium hydroxide, alumina trihydrate, magnesium carbonate and calcium carbonate and is present in an amount of from 5 to 20% by weight of the total ceramifying composition.

13. A ceramifying composition according to claim 1 wherein the composition further comprises calcium carbonate in an amount of from 5 to 20% by weight of the total composition.

14. A ceramifying composition according to claim 1 wherein the organic polymer comprises at least one polymer selected from the group consisting of thermoplastic polymers, thermoset polymers, thermoplastic elastomers, cross linked elastomers and rubber.

15. A ceramifying composition according to claim 14 wherein the organic polymer comprises at least one polymer selected from the group consisting of thermoplastic and crosslinked polyethylenes and copolymers and blends thereof wherein the polymer has a density in the range of from 890 to 960 g/liter.

16. A cable comprises at least one insulating layer coating and at least one elongated functional element of the cable, wherein the at least one insulating layer coating comprises the ceramifying composition according to claim 1 or claim 2.

17. A cable according to claim 16 wherein the at least one insulating layer is a single insulating layer about the elongated functional element.

18. A cable according to claim 17 wherein the single insulating layer has an inner surface abutting the functional element and a free outer surface.

19. A cable according to claim 18 wherein the single insulating layer has an outer surface free of coatings.

20. A cable according to claim 17 wherein the single insulating layer forms a self-supporting ceramic on exposure to the elevated temperature experienced under fire conditions.

21. A cable according to claim 17 wherein the single insulating layer when formed into a rectangular test specimen undergoes less than 20% change in linear dimensions along its length on exposure to the elevated temperature experienced under fire conditions.

22. A cable according to claim 16 wherein the inorganic phosphate is ammonium polyphosphate present in an amount in the range of from 8 to 20% by weight of the total ceramifying composition.

23. A cable according to claim 16 wherein the ceramifying composition further comprises 5 to 20% additional inorganic filler comprising at least one compound selected from the group consisting of magnesium hydroxide, alumina trihydrate, magnesium carbonate and calcium carbonate.

24. A ceramifying composition according to claim 1 wherein a rectangular test specimen of the ceramifying composition has a flexural strength of at least 0.3 MPa on exposure to the elevated temperature experienced under fire conditions.

25. A ceramifying composition according to claim 24 wherein the flexural strength is at least 1 MPa on exposure to the elevated temperature experienced under fire conditions.

26. A ceramifying composition according to claim 24 wherein the flexural strength is at least 2 MPa on exposure to the elevated temperature experienced under fire conditions.

27. A ceramifying composition according to claim 2 wherein on exposure to the elevated temperature experienced under fire conditions a rectangular test specimen of the ceramifying composition undergoes less than a 20% change in linear dimensions along its length.

28. A ceramifying composition according to claim 2 wherein on exposure to the elevated temperature experienced under fire conditions a rectangular test specimen of the ceramifying composition undergoes less than a 10% change in linear dimensions along its length.

29. A ceramifying composition according to claim 2 wherein the optional additional inorganic filler comprises calcium carbonate, which is present in an amount of from 5 to 20% by weight of the total composition.

30. A ceramifying composition according to claim 2 wherein the organic polymer comprises at least one polymer selected from the group consisting of thermoplastic polymers, thermoset polymers, thermoplastic elastomers, cross linked elastomers and rubber.

31. A ceramifying composition according to claim 30 wherein the organic polymer comprises at least one polymer selected from the group consisting of thermoplastic and crosslinked polyethylenes and copolymers and blends thereof wherein the polymer has a density in the range of from 890 to 960 g/liter.

32. A ceramifying composition according to claim 1 wherein the composition further comprises at least one metal carbonate as additional inorganic filler, in an amount of up to 30% by weight based on the total weight of the composition.

33. A ceramifying composition according to claim 2 wherein the additional inorganic filler is a metal carbonate.

34. A ceramifying composition according to claim 1 wherein said composition comprises less than 1% by weight of additional intumescing agents based on the total weight of the composition.

35. A ceramifying composition according to claim 1 wherein the residue remaining constitutes at least 55% by weight of the composition before pyrolysing.

36. A ceramifying composition according to claim 1 wherein the residue remaining constitutes at least 70% by weight of the composition before pyrolysing.

* * * * *

UNITED STATES PATENT AND TRADEMARK OFFICE
CERTIFICATE OF CORRECTION

PATENT NO.       : 8,409,479 B2                                     Page 1 of 1
APPLICATION NO.  : 10/594649
DATED            : April 2, 2013
INVENTOR(S)      : Alexander et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 968 days.

Signed and Sealed this
First Day of September, 2015

Michelle K. Lee
*Director of the United States Patent and Trademark Office*